(12) United States Patent
Martinez et al.

(10) Patent No.: US 11,082,109 B2
(45) Date of Patent: Aug. 3, 2021

(54) SELF-LEARNING BASED ON WI-FI-BASED MONITORING AND AUGMENTATION

(71) Applicant: Aerial Technologies Inc., Montreal (CA)

(72) Inventors: Michel Allegue Martinez, Terrebonne (CA); Negar Ghourchian, Montreal (CA); David Grant, Santa Rosa Valley, CA (US); Francois Morel, Kirkland (CA); Pascal Paradis-Theberge, Montreal (CA)

(73) Assignee: Aerial Technologies Inc., Montreal (CA)

( * ) Notice: Subject to any disclaimer, the term of this patent is extended or adjusted under 35 U.S.C. 154(b) by 0 days.

(21) Appl. No.: 16/795,219

(22) Filed: Feb. 19, 2020

(65) Prior Publication Data
US 2020/0328793 A1    Oct. 15, 2020

Related U.S. Application Data

(60) Provisional application No. 62/809,393, filed on Feb. 22, 2019, provisional application No. 62/809,421, filed on Feb. 22, 2019.

(51) Int. Cl.
*H04B 7/06*     (2006.01)
*H04L 5/00*     (2006.01)
(Continued)

(52) U.S. Cl.
CPC ......... *H04B 7/0626* (2013.01); *H04L 1/0026* (2013.01); *H04L 5/0023* (2013.01);
(Continued)

(58) Field of Classification Search
CPC ... H04W 24/10; H04W 76/27; H04W 72/085; H04W 52/365; H04W 72/042;
(Continued)

(56) References Cited

U.S. PATENT DOCUMENTS 8,073,441 B1   12/2011   Unger et al.
9,219,790 B1   12/2015   Filev et al.
(Continued)

FOREIGN PATENT DOCUMENTS

CA     3044480      5/2018
CN     105828289    8/2016
(Continued)

OTHER PUBLICATIONS

PCT Application No. PCT/IB2020/051503 International Search Report and Written Opinion dated Jul. 30, 2020.
(Continued)

*Primary Examiner* — Joshua L Schwartz
(74) *Attorney, Agent, or Firm* — Polsinelli LLP

(57) ABSTRACT

Technologies for attestation techniques, systems, and methods for determining an individual's movement are provided. The individual's movement is determined by passive indoor positioning technology using channel state information (CSI). A first set of data associated with an impulse or frequency response determined using channel state information (CSI) may be received from a Wireless access point located in proximity to a monitored space. A second set of data may also be received from an Internet of Things (IoT) device located in proximity to the monitored space. The first set of data may be compared to the second set of data. A profile database may be updated to replace the first set of data with the second set of data when the first and second sets of data are different.

15 Claims, 11 Drawing Sheets

(51) Int. Cl.
*H04W 4/029* (2018.01)
*H04W 24/08* (2009.01)
*H04L 1/00* (2006.01)

(52) U.S. Cl.
CPC .......... *H04L 5/0057* (2013.01); *H04W 4/029* (2018.02); *H04W 24/08* (2013.01)

(58) Field of Classification Search
CPC ... H04L 1/0026; H04L 5/0092; H04L 5/0057; H04L 5/0053; H04L 5/0007; H04B 7/0626; H04B 7/309
See application file for complete search history.

(56) References Cited

U.S. PATENT DOCUMENTS

| | | | |
|---|---|---|---|
| 9,414,115 | B1 | 8/2016 | Mao et al. |
| 9,854,292 | B1 | 12/2017 | Matthews et al. |
| 10,045,191 | B2* | 8/2018 | Nguyen ............ H04W 72/0446 |
| 2006/0224938 | A1 | 10/2006 | Fikes et al. |
| 2007/0024580 | A1 | 2/2007 | Sands et al. |
| 2007/0266395 | A1 | 11/2007 | Lee et al. |
| 2010/0242063 | A1 | 9/2010 | Slaney et al. |
| 2011/0029277 | A1 | 2/2011 | Chowdhary et al. |
| 2011/0117924 | A1 | 5/2011 | Brunner et al. |
| 2011/0258039 | A1 | 10/2011 | Patwa et al. |
| 2012/0135733 | A1 | 5/2012 | Cormier et al. |
| 2012/0324494 | A1 | 12/2012 | Burger et al. |
| 2013/0014136 | A1 | 1/2013 | Bhatia et al. |
| 2013/0115974 | A1 | 5/2013 | Lee et al. |
| 2014/0033240 | A1 | 1/2014 | Card et al. |
| 2014/0223467 | A1 | 8/2014 | Hayton et al. |
| 2015/0026708 | A1 | 1/2015 | Ahmed et al. |
| 2015/0050923 | A1 | 2/2015 | Tu et al. |
| 2015/0092747 | A1 | 4/2015 | Ganesan |
| 2015/0113556 | A1 | 4/2015 | Weast et al. |
| 2015/0365787 | A1 | 12/2015 | Farrell |
| 2016/0127766 | A1 | 5/2016 | Luk et al. |
| 2016/0174185 | A1 | 6/2016 | Ramakrishnan et al. |
| 2017/0135635 | A1 | 5/2017 | Bostick et al. |
| 2017/0160089 | A1 | 6/2017 | Jang et al. |
| 2017/0332192 | A1 | 11/2017 | Edge |
| 2017/0366955 | A1 | 12/2017 | Edge |
| 2018/0181094 | A1 | 6/2018 | Funk et al. |
| 2018/0184165 | A1 | 6/2018 | Maughan et al. |
| 2018/0330406 | A1 | 11/2018 | Deluca et al. |
| 2019/0174170 | A1 | 6/2019 | Chen |
| 2019/0188756 | A1 | 6/2019 | Bradley et al. |
| 2019/0306023 | A1* | 10/2019 | Vasseur .................. H04L 41/16 |
| 2020/0186321 | A1* | 6/2020 | Hwang ...................... H04L 5/14 |
| 2020/0226388 | A1 | 7/2020 | Ghessassi |
| 2020/0292572 | A1 | 9/2020 | Bateni |
| 2020/0296463 | A1 | 9/2020 | Martinez |
| 2020/0302478 | A1 | 9/2020 | Martinez |
| 2020/0303046 | A1 | 9/2020 | Martinez |
| 2020/0327430 | A1 | 10/2020 | Martinez |
| 2020/0329343 | A1 | 10/2020 | Martinez |
| 2020/0383119 | A1* | 12/2020 | Sun ........................ H04L 5/0092 |
| 2021/0063537 | A1 | 3/2021 | Martinez |

FOREIGN PATENT DOCUMENTS

| | | |
|---|---|---|
| WO | WO 2020/170221 | 8/2020 |
| WO | WO 2020/240526 | 12/2020 |

OTHER PUBLICATIONS

U.S. Appl. No. 16/798,138 Office Action dated Sep. 8, 2020.
PCT/IB2020/051503, Handling Concept Drift in Wi-Fi Based Localization, filed Feb. 22, 2020.
U.S. Appl. No. 16/796,662, Michel A. Martinez, Smart Media Display, filed Feb. 20, 2020.
U.S. Appl. No. 16/795,198, Michel A. Martinez, Advertisement Engagement Measurement, filed Feb. 19, 2020.
U.S. Appl. No. 16/798,138, Michel A. Martinez, Small Motion Vector Identification in a Wi-Fi Motion Detection System, filed Feb. 21, 2020.
U.S. Appl. No. 16/794,668, Michel A. Martinez, Robotic H Matrix Creation, filed Feb. 19, 2020.
U.S. Appl. No. 16/798,319, Michel A. Martinez, Wi-Fi Based Condition Monitoring, filed Feb. 22, 2020.
U.S. Appl. No. 16/798,148, Seyedehsan Bateni, Wireless Motion Detection Using Multiband Filters, filed Feb. 21, 2020.
U.S. Appl. No. 17/006,579, Michel A. Martinez, System and Method for Presence and Pulse Detection From Wireless Systems, filed Aug. 28, 2020.
PCT Application No. PCT/IB2020/060271 International Search Report and Written Opinion dated Feb. 15, 2021.
U.S. Appl. No. 16/796,662 Office Action dated Feb. 12, 2021.
U.S. Appl. No. 17/014,720, Michel A. Martinez, Monitoring Activity Using Wi-Fi Motion Detection, filed Sep. 8, 2020.
PCT/IB2020/060271, System for Multi-Path 5G and Wi-Fi Motion Detection, filed Nov. 2, 2020.
Deng et al., "CC-DTW: An Accurate Indoor Fingerprinting Localization Using Calibrated Channel State Information and Modified Dynamic Time Warping", Sensors 19, No. 9: 1984, Apr. 28, 2019 (Apr. 28, 2019), [online] [retrieved on Aug. 20, 2020 (Aug. 20, 2020)], Retrieved from the internet: https://www.mdpif.com/1424-8220/19/9/1984.
Ghourchian et al., "Real-Time Indoor Localization in Smart Homes Using Semi-Supervised Learning", Association for the Advancement of Artificial Intelligence, Twenty-Ninth AAAI Conference on Innovative Applications, pp. 4670-4677, Feb. 8, 2017 (Feb. 8, 2017), [online] [retrieved on Aug. 20, 2020 (Aug. 20, 2020)], Retrieved from the internet: https://aaai.org/ocs/index.php/IAAI/IAAI17/paer/view/15010.
Rui Zhou et al., "Device-free Localization Based on CSI Fingerprints and Deep Neural Networks", 15 Annual IEEE International Conference on Sensing, Communication, and Networking (SECON), Jun. 11, 2018 (Jun. 11, 2018), [online] [retrieved on Aug. 20, 2020 (Aug. 20, 2020] Retrieved from the internet: https://dl.acm.org/doi/10.1145/2639108.2639143.
Xuyu Wang et al., "CSI-Based Fingerprinting for Indoor Localization: A Deep Learning Approach", IEEE Transactions on Vehicular Technology, vol. 66, No. 1, pp. 763-776, Mar. 22, 2016 (Mar. 22, 2016), [online] [retrieved on Aug. 20, 2020 (Aug. 20, 2020), Retrieved from the internet: https://ieeexplore://ieeexplore.ieee.org/documents/7438932.
Yang Wang et al., "E-eyes: Device-free Location-oriented Activity Identification Using Fine-grained Wifi Signatures", MobiCom'14, pp. 617-628 Sep. 7, 2014 (Sep. 7, 2014), [retrieved on Aug. 20, 2020 (Aug. 20, 2020)], Retrieved from the internet: https://dl.acm.org/doi/10.1145/2639108.2639143.
PCT Application No. PCT/IB2020/055186 International Search Report and Written Opinion dated Oct. 15, 2020.

* cited by examiner

| Device | Location | Function | Activity |
| --- | --- | --- | --- |
| Switch 1 | Bathroom | Lights | Turn Switch |
| Switch 2 | Living Room | Lights | Turn Switch |
| Switch 3 | Kitchen | Lights | Turn Switch |
| Thermostat | Living Room | Temperature | Adjust Dial |
| ... | ... | ... | ... |
| Refrigerator | Kitchen | Food Storage | Open Door |

FIG. 1B

SELF-LEARNING BASED ON WI-FI-BASED MONITORING AND AUGMENTATION

CROSS-REFERENCE TO RELATED APPLICATIONS

The present application claims the priority benefit of U.S. Provisional Patent Application No. 62/809,393 filed on Feb. 22, 2019 and entitled "Meta Tag for Waveform Artifacts," and U.S. Provisional Patent Application No. 62/809,421 filed on Feb. 22, 2019 and entitled "Self-Learning Confidence Counter," the disclosures of which are incorporated herein by reference in their entirety.

BACKGROUND OF THE INVENTION

1. Field of the Invention

The present disclosure is generally related to using passive Wi-Fi-based motion detection systems to track movement of individuals, as well as more specifically to use of context devices or IoT devices to provide and augment data collected for location and activity detection.

2. Description of the Related Art

Motion detection is the process of detecting a change in the position of an object relative to its surroundings or a change in the surroundings relative to an object. Motion detection can be accomplished by a software-based monitoring algorithm, which, for example when it detects motions will signal the surveillance camera to begin capturing the event. An advanced motion detection surveillance system can analyze the type of motion to see if it warrants an alarm.

It is therefore desirable to have an integrated and wireless means of detecting individuals and their actions or inactions as well as determining the nature of the actions or inactions while using other devices with different measuring means to confirm and augment the data collected.

SUMMARY OF THE CLAIMED INVENTION

Disclosed herein are systems, methods and computer-readable storage media for determining an individual's movement, wherein the individual's movement is determined by passive indoor positioning technology using channel state information (CSI). In some aspects, an example method can include: receiving, from an activity identification module of a Wi-Fi monitoring system, a first set of data associated with an impulse or frequency response determined using channel state information (CSI), the first set of data retrieved from a wireless access point located in proximity to a monitored space; receiving, from a base module of the Wi-Fi monitoring system, a second set of data retrieved from an Internet of Things (IoT) device located in proximity to the monitored space; comparing the first set of data and the second set of data; and updating a profile database, storing the first set of data, by replacing the first set of data with the second set of data when the first and second sets of data are different. Furthermore, the first and second sets of data may include location or activity data. The activity data may be associated with a radio map using Wi-Fi localization to translate Wi-Fi signal strengths into locations and movement.

BRIEF DESCRIPTION OF THE FIGURES

FIG. 1B illustrates an exemplary IoT device database.

DETAILED DESCRIPTION

Figure 1A:
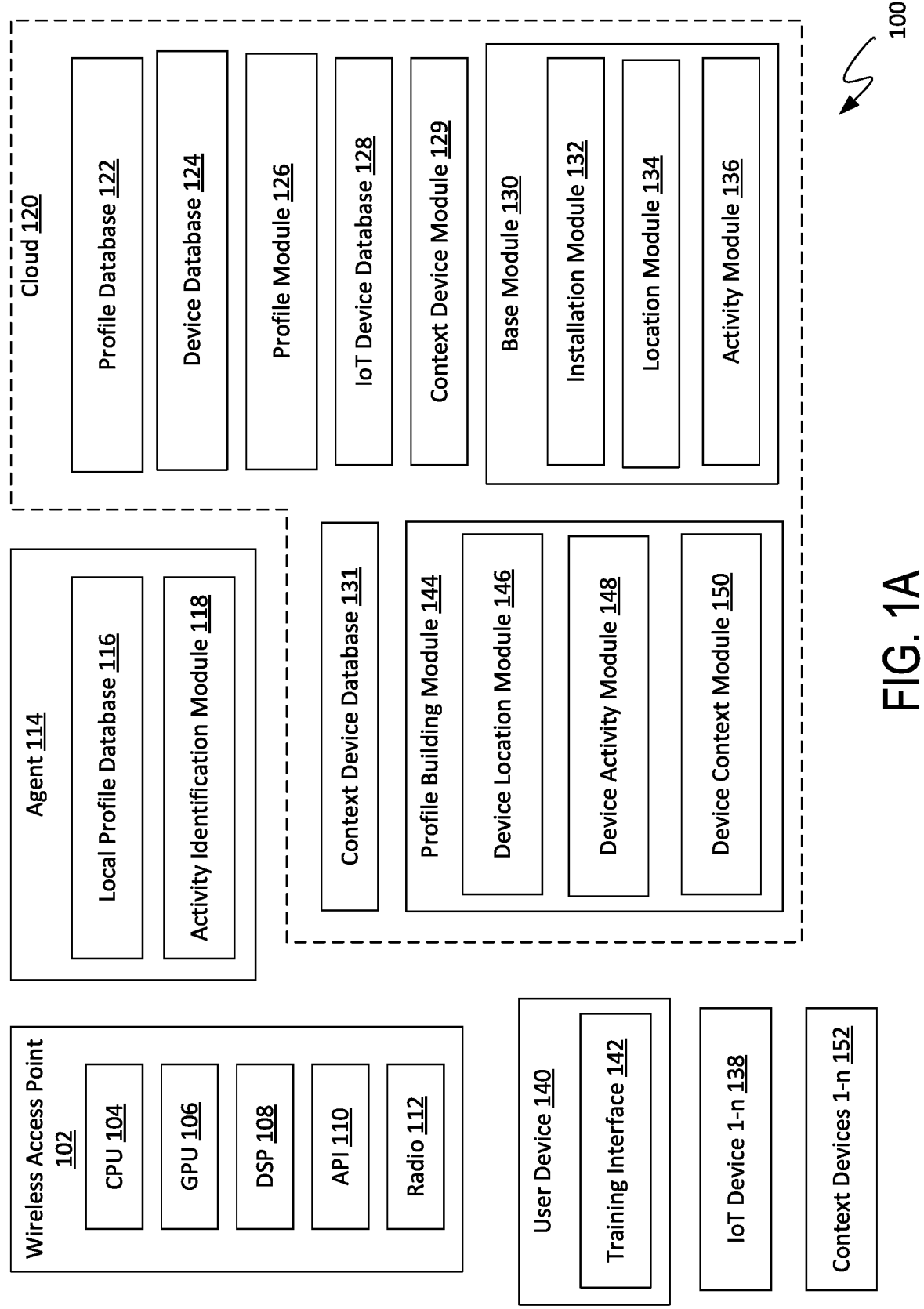
FIG. 1A illustrates an exemplary network environment in which a system for self-learning based on Wi-Fi-based monitoring and augmentation.

Disclosed herein are systems, methods and computer-readable storage media for determining an individual's movement. The individual's movement is determined by passive indoor positioning technology using channel state information (CSI). In some aspects, an exemplary method can include receiving, from an activity identification module of a Wi-Fi monitoring system, a first set of data associated with an impulse or frequency response determined using channel state information (CSI). The first set of data may have been retrieved from a wireless access point located in proximity to a monitored space. Methods may further include receiving a second set of data retrieved from an Internet of Things (IoT) device located in proximity to the monitored space; comparing the first set of data and the second set of data, updating a profile database, storing the first set of data, and replacing the first set of data with the second set of data when the first and second sets of data are different. Furthermore, the first and second sets of data may include location or activity data. The activity data may be associated with a radio map using Wi-Fi localization to translate Wi-Fi signal strengths into locations and movement.

The exemplary method may further include taking a sample of the impulse or frequency response being defined as linked to the IoT device. The exemplary method may further include receiving a third set of data retrieved from one or more context devices located in proximity to the monitored space. The exemplary method may further include polling the activity identification module for known and unknown activities. The exemplary method may further include assigning an activity definition to an unknown activity profile of the profile database when a specific sequence of at least two data points from at least two different connected context devices that occur within a predefined time window coincide with the activity definition. The exemplary method may further include retrieving all matching profiles from a profile database without a known activity, determining if a number of matching profiles receives is greater than a sample size threshold, and assigning an activity definition to the number of matching profiles.

The technologies herein can provide individual location and movements based upon a device-free indoor positioning technology that can monitor individuals in a monitored space based on passively observing changes in the environment and providing context devices or IoT devices to validate and augment data collected for individuals' tracked locations and movements. Such changes would be determined based on comparisons of types of movements that have built an ensemble of fingerprints during a training phase. During a testing phase, fingerprints generated from new data would be compared with those from the training phase to determine a location or types of movements of an individual. The differences between the fingerprints generated from the new data and those from the training phase would result in data indicating position or engagement of movement, reflecting where and how much an individual is moving in the monitored space.

The approaches herein can provide systems, methods, and computer-readable storage media for determining individuals' movements, which may be determined by passive indoor positioning technology using channel state information (CSI). The disclosure begins with an initial discussion of systems and technologies for determining individual movement through the passive indoor positioning technology using CSI, as generally exemplified by a network environment 100 of FIG. 1A. FIG. 1B illustrates an exemplary database of the network environment 100. FIGS. 2 through 10 illustrate exemplary flows with respect to modules for the network environment 100.

FIG. 1A illustrates an exemplary network environment 100 in which a system for self-learning based on Wi-Fi-based monitoring and augmentation. The network environment 100 may be used for a localization and activity monitoring system in a smart indoor environment that further uses machine-learning algorithms to learn and recognize various kinds of activities. The network environment 100 may comprise a wireless access point (AP) 102 configured to record channel state information (CSI). In Wi-Fi communications, CSI refers to known channel properties of a radio frequency (RF) communication link that describes how a signal propagates from a transmitter to a receiver and represents a combined effect of various properties such as channel frequency response data, channel phase response data, and/or channel impulse response data. The frequency response data may be associated with a radio map using Wi-Fi localization to translate Wi-Fi signal strengths into locations. The radio map may further comprise metadata including frequency data of a channel, phase response data of the channel, and impulse response data of the channel that describe a wireless communication link between paired devices used to compare with a signal scan.

The wireless AP 102 may comprise a central processing unit (CPU) 104 that carries out instructions for the wireless AP 102 to perform. The wireless AP 102 may also comprise a graphics processing unit (GPU) 106 that is a specialized electronic circuit designed to rapidly manipulate and alter memory to accelerate the creation of images in a frame buffer intended for output to a display device. The wireless AP 102 may also comprise a digital signal processor (DSP) 108 that is a specialized microprocessor, or a system-in-a-package (SiP) component, with its architecture optimized for the operational needs of digital signal processing.

The DSP 108 may be configured to measure, filter, or compress continuous real-world analog signals. The wireless AP 102 may also comprise an application program interface (API) 110 that is a set of routines, protocols, and tools for building software applications, programming any graphical user interface (GUI) components, and specifying how software components interact. The API 110 may provide metadata related to the CSI to an agent 114.

The wireless AP 102 may comprise a radio component 112 that is compliant with either 802.11b or 802.11g, using an omnidirectional antenna, and may have a range of 100 m (0.062 mi). The radio component 112 may have an external semi-parabolic antenna (15 dB gain) with a similarly equipped receiver at the far end might have a range over 20 miles. The wireless AP 102 may be equipped with a network interface card (NIC) that connects the wireless AP 102 to a computer network. The radio component 112 may be a transceiver, a transmitter, or a receiver.

The agent 114 may be a device or module executable to collect CSI-related metadata from the wireless AP 102, filter the CSI-related metadata, and send the filtered CSI-related metadata to one or more cloud servers 120 for activity identification. The activity identification can be accomplished on an edge, at an agent level, or "in the cloud" (e.g., cloud servers 120), or some combination of the three. The agent 114 may comprise a local profile database 116 that is utilized when at least a portion of the activity identification is done on the edge. Such identification could be a simple motion versus no-motion determination profile database or a more extensive profile database used for identifying activities, objects, individuals, biometrics, etc.

The agent 114 may also comprise an activity identification module 118 that distinguishes between activities, such as between walking and in-place activities. In general, a walking activity may cause significant pattern changes to amplitude over time of the channel impulse response, since it involves significant body movements and location changes. In contrast, an in-place activity (such as watching TV on a sofa) only involves relative smaller body movements and will not cause significant pattern changes to amplitude over time of the channel impulse response. Instead, in-place activity is reflected by certain repetitive patterns within the channel impulse response. Wi-Fi localization information related to the motion data can, in some examples, be used to help quantify the level of engagement motion.

The cloud server 120 may also analyze and create profiles describing various activities. The one or more cloud server 120 may comprise a profile module 126 that monitors the received CSI-related metadata from a continuous monitoring of a monitored space. The profile module 126 may also identify multiple similar patterns of a set of CSI-related metadata that do not have a matching profile in a profile database 122 of the one or more cloud server 120. Then, the profile module may combine the set of CSI-related metadata with a user feedback to label the resulting clusters to define a new profile that is then added to the profile database 122. The profiles in the profile database 122 may be simple motion versus no-motion determination profiles or a more extensive profile database used for identifying activities, objects, individuals, biometrics, etc. The one or more cloud server 120 may further comprise a device database 124 that stores device ID of all connected wireless APs.

The one or more cloud server 120 may also comprise an IoT device database 128 that stores information related to each IoT device 138 connected to the network environment 100. That information includes, but it not limited to: information related to location and function of each IoT device 138, as well as information related to one or more activities associated with operating each IoT device 138, all of which is provided either by the respective IoT device 138 or by a user through a training interface 142. The IoT device database 128 could also include sensor data feed columns for devices with additional computational capabilities, such as a virtual assistant, that would provide additional context data to further refine the profile associated with the activity. Definitions may be provided either by the respective IoT device 138. FIG. 1B illustrates an exemplary IoT device database.

Referring back to FIG. 1A, the one or more cloud server 120 may also comprise a base module 130 executable to monitor that activity of the wireless AP 102 through the agent 114 and any IoT devices 138 connected to the network environment 100. The base module 130 triggers an installation module 132 when new IoT devices 138 are connected, and a location module 134 and an activity module 136 when data events are detected simultaneously in both the activity identification module 118 and one of the IoT devices 138. The installation module 132 connects new IoT devices 138 to the network environment 100 and registers them in the IoT device database 128.

The location module 134 may compare a location associated with an impulse or frequency response of the channel in the profile database 122 identified by the activity identification module 118, to the location associated with the data event from a respective IoT device 138. When the two locations do not match, the data provided by the IoT device 138 is sent to the profile module 126 to be used to improve the profile definitions in the profile database 122. The activity module 136 may compare the activity associated with the impulse or frequency response of the channel in the profile database 122, identified by the activity identification module 118, to the activity associated with the data event from a same or different respective IoT device 138. When the two activities do not match, the data provided by the same or different respective IoT device 138 may be sent to the profile module 126 to be used to improve the profile definitions in the profile database 122.

At least one IoT device 138, or a group of up to n number of IoT devices 138, may include consumer-connected devices such as smart TVs, smart speakers, toys, wearables, smart appliances, smart meters, commercial security systems and smart city technologies, including those used to monitor traffic and weather conditions, which can be examples of industrial and enterprise IoT devices that could all be incorporated into the network environment 100 in various combinations. A user device 140, such as a smartphone, personal computer, or tablet, may comprise the training interface 142 that allows the user to provide location and activity definitions to the network environment 100.

The one or more cloud server 120 may also comprise a context device module 129 that populates a context device database 131 with definitions of device location and function as defined either by data provided by the devices themselves or by user definition. The one or more cloud server 120 may also comprise a profile building module 144 that monitors the output of the activity identification module 118 to identify unknown activity profiles that coincide with data events from one or more context device(s) 152, and when the one or more context device(s) 152 detects the data events, triggers a device location module 146, a device activity module 148, and a device context module 150, in order to define new profiles with location and activity definitions.

The device location module 146 may assign location definitions to unknown activity profiles when they coincide with data points from a respective context device 152 that has a known location. For example, for a connected light switch located in the kitchen, an activity profile coinciding with the switch's activation would be known to take place in the kitchen. The device activity module 148 may assign an activity definition to unknown activity profiles when they coincide with data points from a respective context device 152 that has a known activity, for example, a connected light switch has a function of activating kitchen lights, an activity profile coinciding with the switch's activation would be assigned the definition of activating kitchen lights, after a statistically significant sample of similar activities taking place in the same context is observed.

The device activity module 148 may assign also an activity definition to unknown activity profiles when they coincide with a specific sequence of at least two data points from at least two different connected context devices 152 that occur within a predefined time window (in this example five seconds), from which an activity definition can be inferred. For example, an activity profile that coincided with the activation of the stove two seconds after the activation of the kitchen lights, can be inferred to be the start of meal preparation. The activity definition can only be applied after the same activity profile is observed, coinciding with the sequential data points from the different connected context devices 152, a statistically significant number of times. The context device database 131 may store the location, function, and activity, as well as definitions that coincide with their operation. The user device 140, such as a smartphone, tablet, or personal computer, may allow the user to interact with the one or more cloud server 120 in order to configure the network environment 100 and provide the context device module 129 with location, function, and activity definitions associated with context devices 152.

Figure 2:
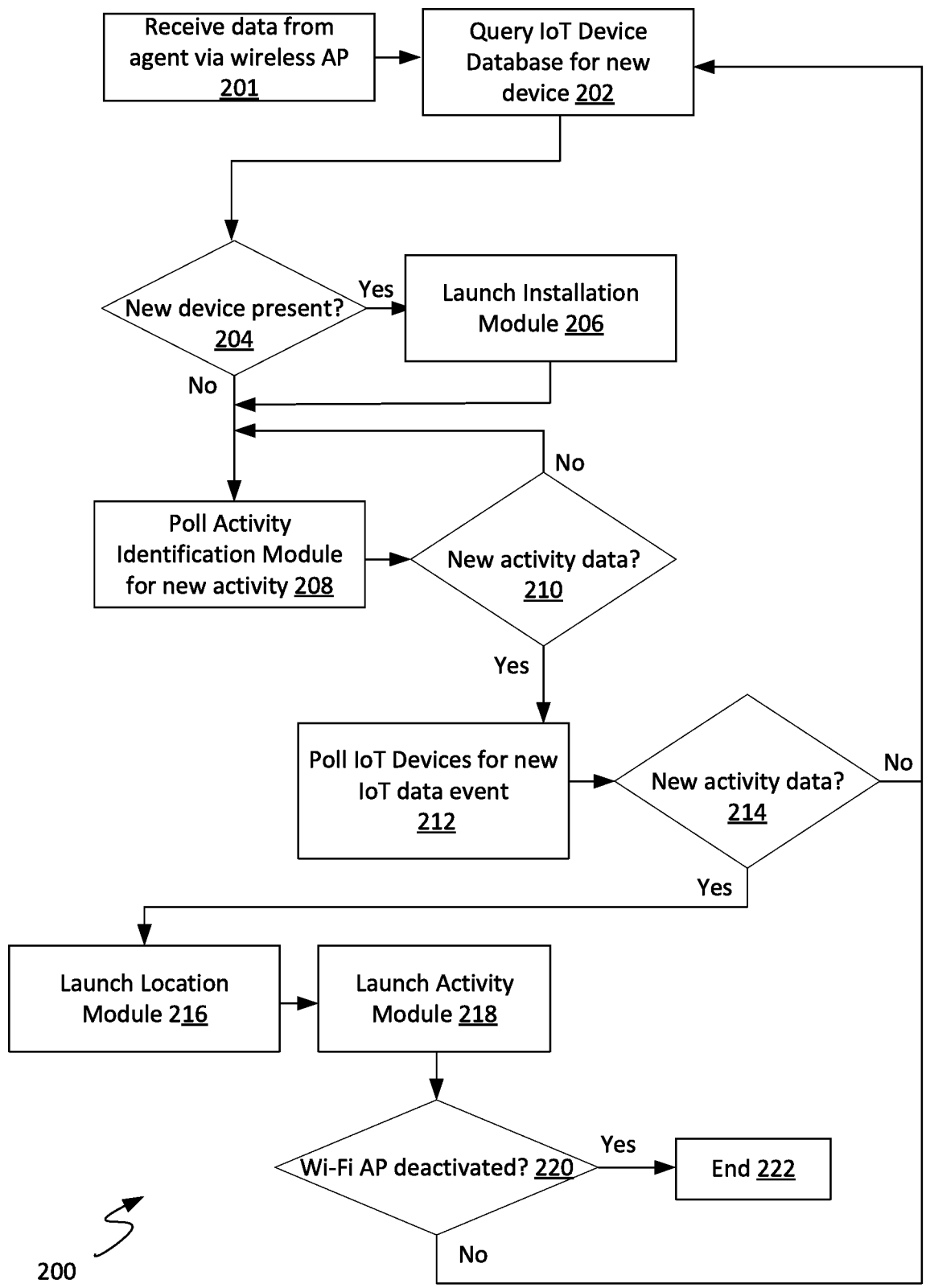
FIG. 2 is a flowchart illustrating an exemplary method for self-learning based on Wi-Fi-based monitoring and augmentation.

FIG. 2 is a flowchart illustrating an exemplary method 200 for self-learning based on Wi-Fi-based monitoring and augmentation. Method 200 may be performed based on execution of base module 130. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The base module process may begin with data being received via the agent 114 from the wireless AP 102 at step 201. The base module 130 may query the IoT device database 128 for presence of a new IoT device 138 being added to a network that the wireless AP is connected to at step 202. The base module 130 then may determine if the new IoT device 138 is present at step 204. If the new IoT device 138 is detected in the IoT device database 128, the base module 130 may launch the installation module 132 at step 206. Following step 206 or if no new device is present, the base module 130 may poll the activity identification module 118 for new motion data at step 208. The base module 130 may determine if the activity identification module 118 has identified motion at step 210. If there is motion identified, the base module 130 may poll the IoT devices 138 in the IoT device database 128 for new data event(s) at step 212.

Then, the base module 130 may determine if there is a respective IoT device 138 that coincides with the motion data at step 214. If there is both motion and IoT data, the base module 130 may call the location module 134 that will determine if the location identified by the activity identification module 118 is in agreement with the location data from the respective IoT device at step 216. If not, the base module 130 may return to step 202.

Once the location module 134 has completed, the base module 130 may call the activity module 136 that will determine if the activity identified by the activity identification module 118 is in agreement with the activity data from the IoT device 138 at step 218. The base module 130 may then determine if data is still being received from the wireless AP 102, via the agent 114 at step 220. If data is still coming in from the agent 114, the base module 130 may return to step 202. If the data is no longer coming from the agent 114, the base module process may end at step 222.

Figure 3:
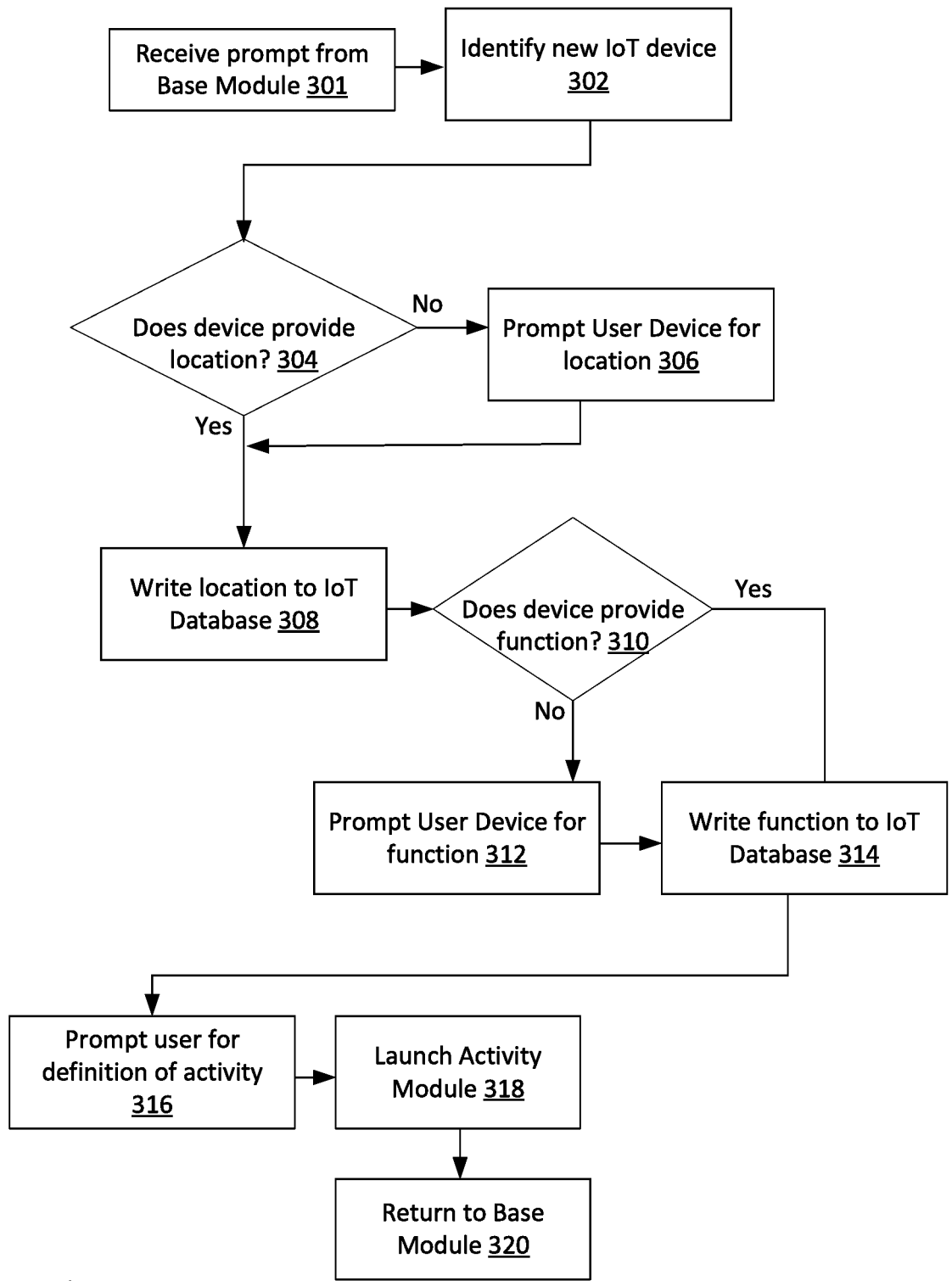
FIG. 3 is a flowchart illustrating an exemplary method for device installation.

FIG. 3 is a flowchart illustrating an exemplary method 300 for device installation. Method 300 may be performed based on execution of installation module 132. The installation process may begin with the installation module 132 receiving a prompt from the base module 130 at step 301. The installation module 132 then may identify a new IoT device 138 that was added to the IoT device database 128, such as make, model, and capabilities at step 302. The installation module 132 may then determine if the new IoT device 138 provides data about the location of the new IoT device 138, and write the data provided to the IoT device database 128 at step 304. If the new IoT device 138 does not provide data about its location, the installation module 132 may prompt the user device 140 for the user to input the location of the new IoT device 138 at step 306, such as to indicate that a light switch is in a bathroom.

The installation module 132 may then write the user-provided location of the new IoT device 138 to the IoT device database 128 at step 308. The installation module 132 may then determine if the new IoT device 138 provides data about its function, and write any data provided to the IoT device database 128 at step 310. If the new IoT device 138 does not provide data about its function, the installation module 132 may prompt the user device 140 for the user to input the function of the new IoT device 138 at step 312, such as that a light switch in the bathroom operates the bathroom lights. The installation module 132 may then write the user-provided function of the new IoT device 138 to the IoT device database 128 at step 314.

The installation module 132 may then prompt the user to define the activity at step 316, such as a definition that the activity is activating the light switch. Defining the activity may require the user to provide a natural language definition of the activity. In alternate embodiments, the activity identification module 118 may take a sample of the impulse or frequency response of the channel to the activity being defined as linked to the new IoT device 138. The installation module 132 may then write the user-provided activity of the new IoT device 138 to the IoT device database 128 at step 318. The installation process then may return to the base module 130 at step 320.

Figure 4:
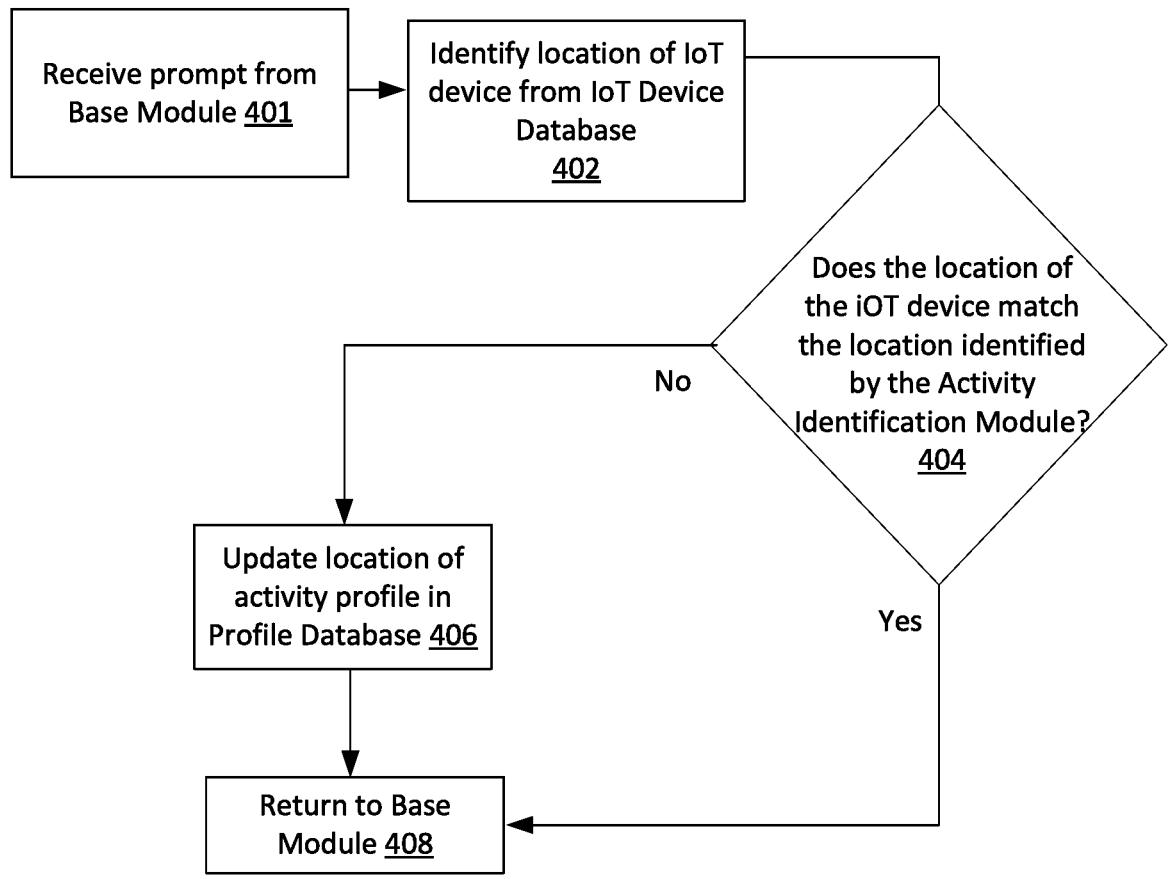
FIG. 4 is a flowchart illustrating an exemplary method for identifying device location.

FIG. 4 is a flowchart illustrating an exemplary method 400 for identifying device location. Method 400 may be performed based on execution of location module 134. The location module process may being with receiving a prompt from the base module 130 that there is IoT data that coincides with motion data from the activity identification module 118 at step 401. Then the location module 134 may identify the location of the IoT device 138 from the IoT device database 128 at step 402. The location module 134 may then determine if the location of the IoT device 138 matches the location of the motion identified by the activity identification module 118. If the location matches, the location module process may return to the base module 130 at step 404. If the location identified by the activity identification module 118 does not match the location of the IoT device 138, the location of the IoT device 138 is sent to the profile module 126 to update the profile database 122 so that in the future when the activity identification module 118 identifies the current profile in the impulse or frequency response of the channel, it will recognize it as taking place in the location defined by the IoT device 138 at step 406. The location module process may then return to the base module 130 at step 408.

Figure 5:
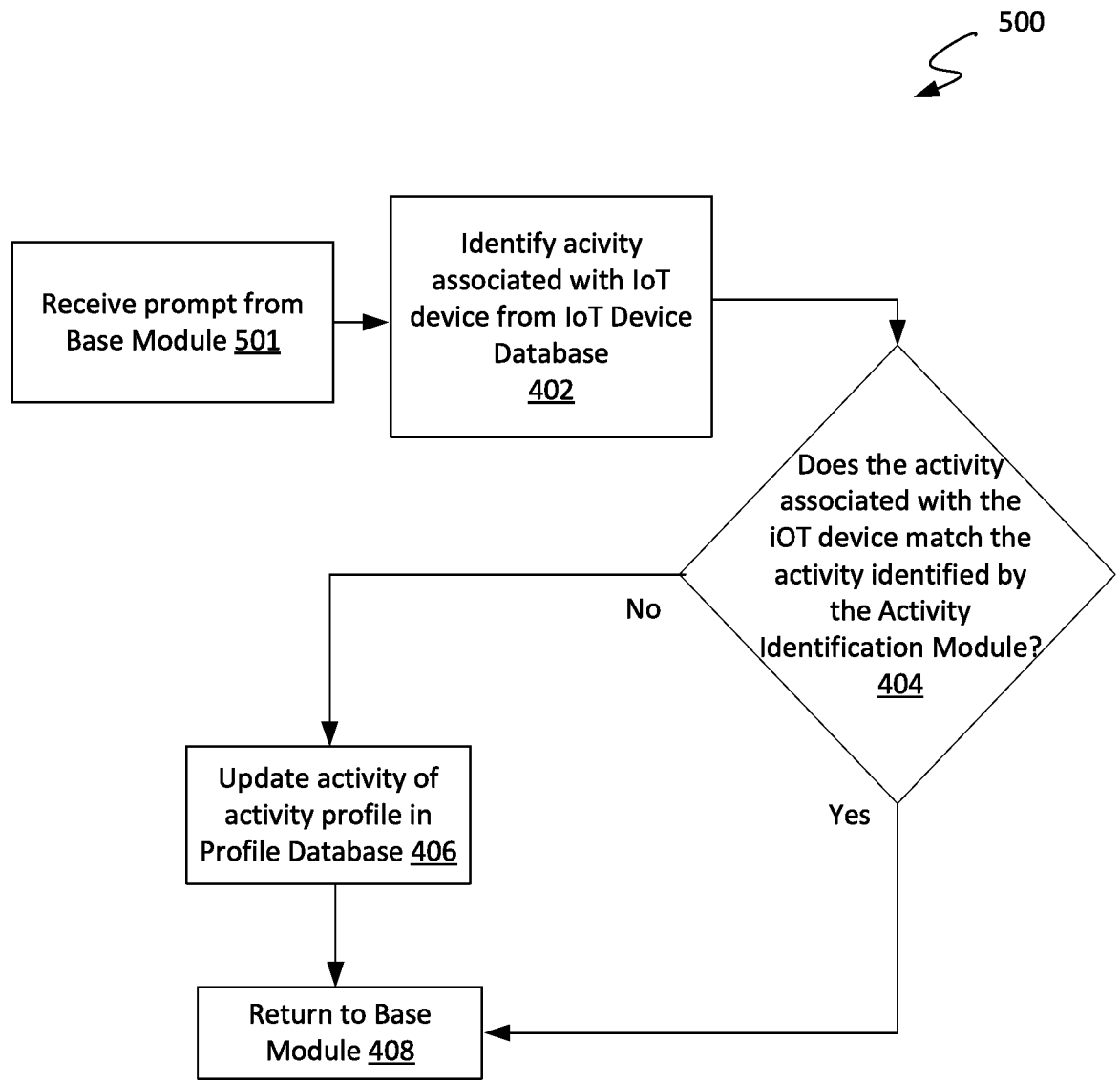
FIG. 5 is a flowchart illustrating an exemplary method for identifying device activity.

FIG. 5 is a flowchart illustrating an exemplary method 500 for identifying device activity. Method 500 may be performed based on execution of activity module 136. The activity module process may begin with receiving a prompt from the base module 130 that there is IoT data that coincides with motion data from the activity identification module 118 at step 501. The activity module 136 may then identify the activity associated with the IoT device 138 from the IoT device database 128 at step 502.

The activity module 136 may then determine if the activity associated with the IoT device 138 matches the activity associated the profile of the frequency response of the channel identified by the activity identification module 118. If the activity matches, the activity module process may return to the base module 130 at step 504. If the activity identified by the activity identification module 118 does not match the activity associated the IoT device 138, the activity associated the IoT device 138 may be sent to the profile module 126 to update the profile database so that in the future when the activity identification module 118 identifies the current profile in the impulse or frequency response of the channel, it will recognize it as the activity defined by the IoT device 138 at step 506. The activity module process may then return to the base module 130 at step 508.

Figure 6:
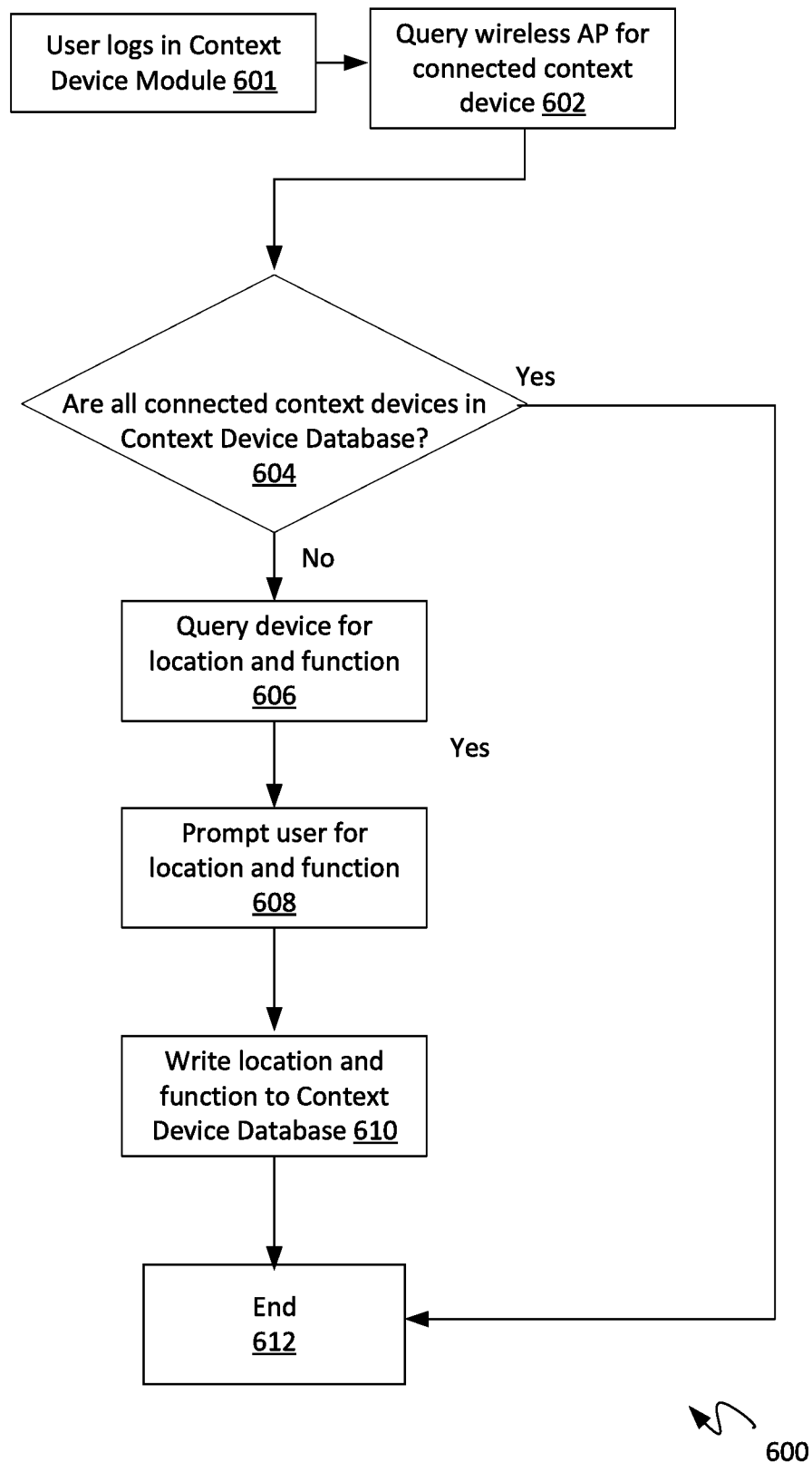
FIG. 6 is a flowchart illustrating an exemplary method for identifying device context.

FIG. 6 is a flowchart illustrating an exemplary method 600 for identifying device context. Method 600 may be performed based on execution of context device module 129. The device context process may begin with the user logging into the module to add a new context device 152 to the network environment 100 at step 601. The context device module 129 may query the wireless AP 102 for connected context devices 152 at step 602. The context device module 129 may determine if all the connected context devices 152 are in the context device database 131. If all connected context devices 152 are already recorded in the context device database 131, the process ends at step 604.

If there are context device(s) 152 connected to the wireless AP 102 but not yet registered in the context device database 131, the context device database 131 may query the context device 152 for its location and function at step 606. If the context device 152 cannot provide the location and or function of the context device 152, the context device module 129 may prompt the user for the location and function of the context device 152. For example, a connected light switch may be able to provide its location information to the system and as a two state (on and off) device, the system can identify its function, but if the device is not able to deliver to the system enough data to identify its location and function (the switch may not have location information associated with it) the system will ask the user to define the missing data, such as this is a light switch in the kitchen at step 608. The device or user provided location and function are written to the context device database 131 for use by the profile building module 144 in collecting context data to use in defining profiles as corresponding to different activities and or locations at step 610. Then the device context process ends at step 612.

Figure 7:
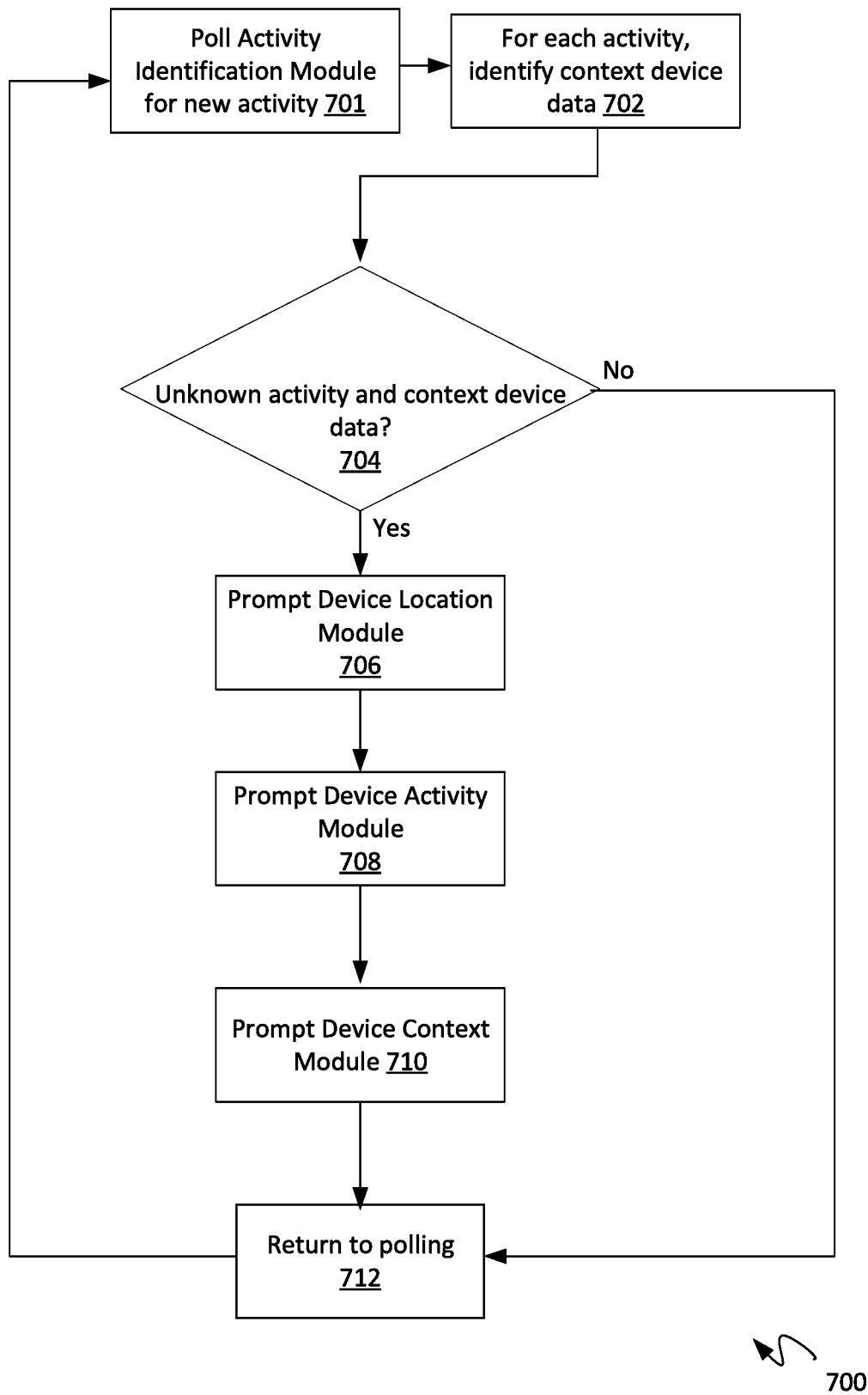
FIG. 7 is a flowchart illustrating an exemplary method for profile building.

FIG. 7 is a flowchart illustrating an exemplary method 700 for profile building. Method 700 may be performed based on execution of profile building module 144. The profile building module 144 may be constantly polling the activity identification module 118 for the identification of known and unknown activities at step 701. For each activity, data events from context devices 152 that coincide with the current activity are identified from the context device database 131 at step 702. For each unknown activity, it is determined if there is a coinciding data event from a context device 152, and if not the profile building module 144 may return to polling for new data events from the activity identification module 118 at step 704. If a coinciding context device data point is detected with the unknown activity, the device location module 146 is prompted, which will assign to the unknown activity profile the location associated with the context device 152 at step 706, such as a light switch being activated in the kitchen will allow the system to define motion profiles that match with the location of the kitchen.

Upon completion of the device location module 146, the device activity module 148 may be prompted, which will assign an activity definition associated with the operation of a context device 152 at step 708, such as turning on the light will allow the system to define motion profiles that match with the activity of turning on the light, in addition to the location of in the kitchen. Upon completion of the device activity module 148, the device context module 150 may be prompted, which will assign an activity definition associated with the sequential operation of at least two context devices 152 at step 710, such as turning on the light in the kitchen followed within 5 seconds by the activation of the stove will allow the system to define motion profiles that match as starting meal preparation. Upon completion of all sub modules, the profile building module 144 may return to polling for new activities at step 712.

Figure 8:
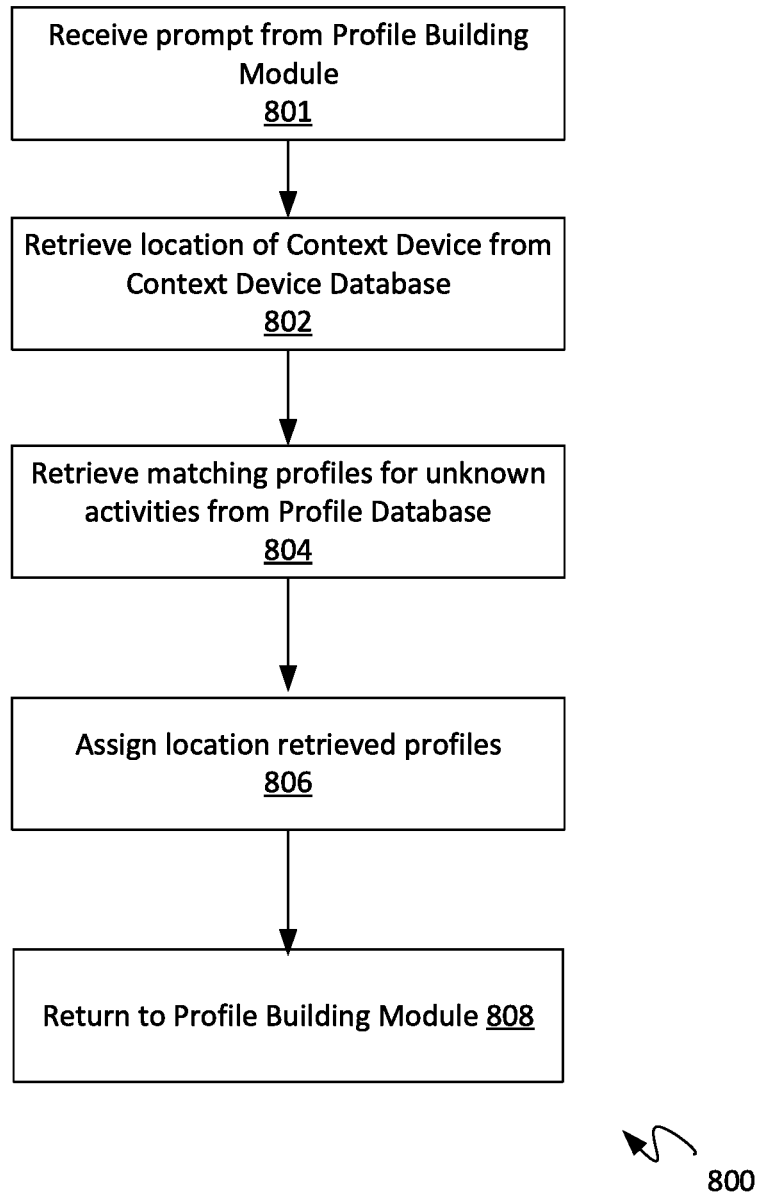
FIG. 8 is a flowchart illustrating an exemplary method for profiling device location.

FIG. 8 is a flowchart illustrating an exemplary method 800 for profiling device location. Method 800 may be performed based on execution of device location module 146. The device location process may begin with receiving a prompt from the profile building module 144 of an unknown activity profile coming from the activity identification module 118 that coincided with a data event from a context device 152 at step 801. The device location module 146 may then retrieve the location of the context device 152 from the context device database 131 at step 802. The device location module 146 may then retrieve from the profile database 122 all matching profiles that do not have a known location at step 804. The device location module 146 may then assign the location of the context device 152 to the retrieved profiles at step 406. The device location process may then return to the profile building module 144 at step 808.

Figure 9:
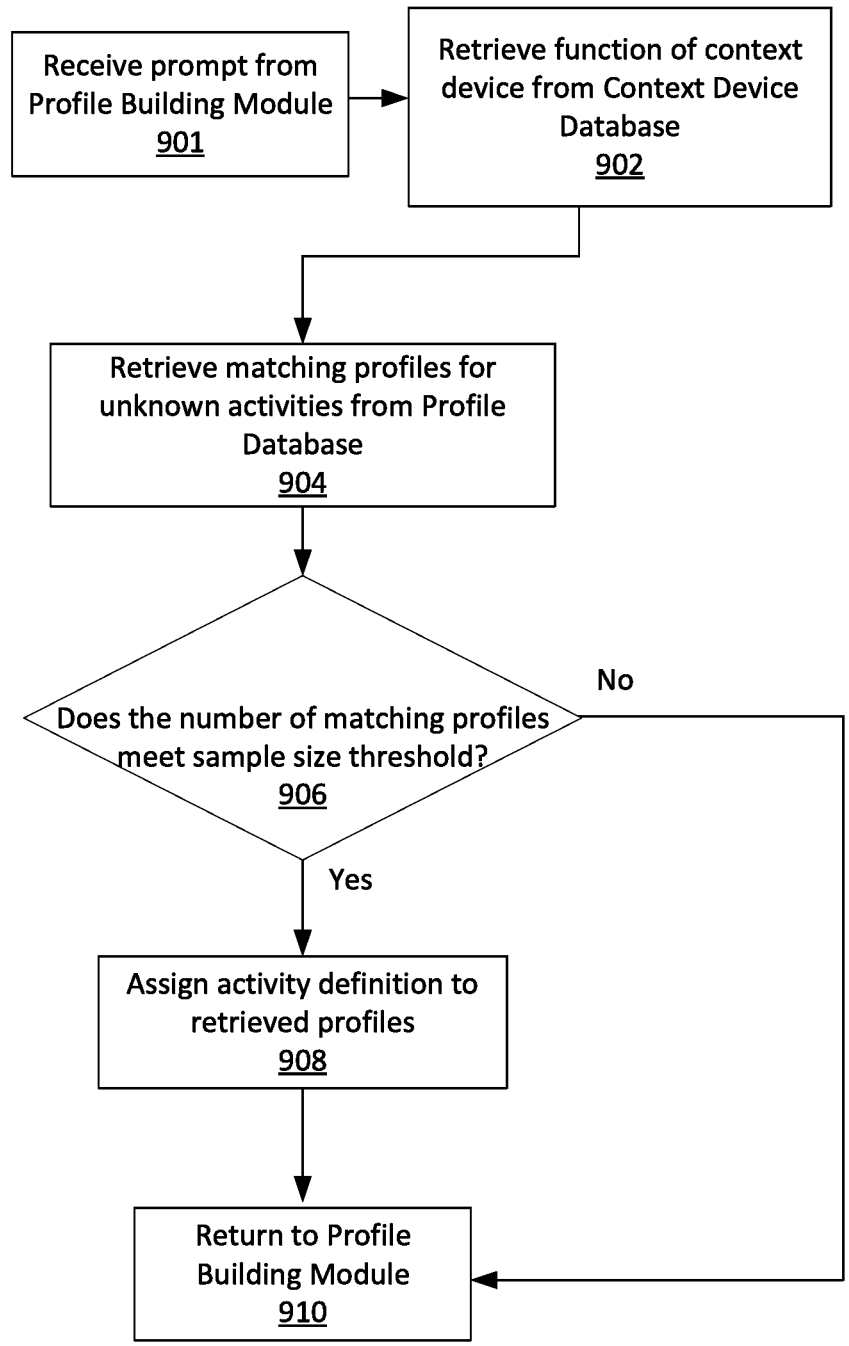
FIG. 9 is a flowchart illustrating an exemplary method for profiling device activity.

FIG. 9 is a flowchart illustrating an exemplary method 900 for profiling device activity. Method 900 may be performed based on execution of device activity module 148. The device activity process may begin with receiving a prompt from the profile building module 144 of an unknown activity profile coming from the activity identification module 118 that coincided with a data event from a context device 152 at step 901. The device activity module 148 may then retrieve the function of the context device 152 from the context device database 131 at step 902. The device activity module 148 may then retrieve from the profile database 122 all matching profiles that do not have a known activity at step 904. The device activity module 148 may then determine if the number of matching profiles received is greater than the sample size threshold.

As opposed to utilizing user feedback to define an unknown profile, the device activity process may define the activity associated with the profile from the function of the context device 152, but only after the same profile has been observed, coinciding with the same operation of the context device 152, a statistically significant number of times can the activity definition be assigned to the profiles. The threshold for statistical significance will vary from between use cases, and activities. The more uniform the received data the lower the threshold, the more variations or noise in the data the larger the number of observations needed to define the activity at step 906.

The device activity module 148 may then assign an activity definition to the retrieved profiles related to the function in the context device database 131. This can be done in a number of different ways including, being supplied by the user in the device context module 150, provided by the context device 152 itself, or through the use of a natural language process, such as those seen in Alexa and Siri. For example a light switch, the device itself can define its function and the activity related to its operation, or the user could say when they configure the system that the operation of this device is associated with activating a switch (which could be augmented by the state of the device to separate two different activities of turning the light on and turning the light off, as the motions would be very similar or identifiable), or a natural language assistant could be asked the activity associated with the activation of a light switch, and will provide and activity definition to populate the profile database 122 with at step 908. The device activity process then returns to the profile building module 144 at step 910.

Figure 10:
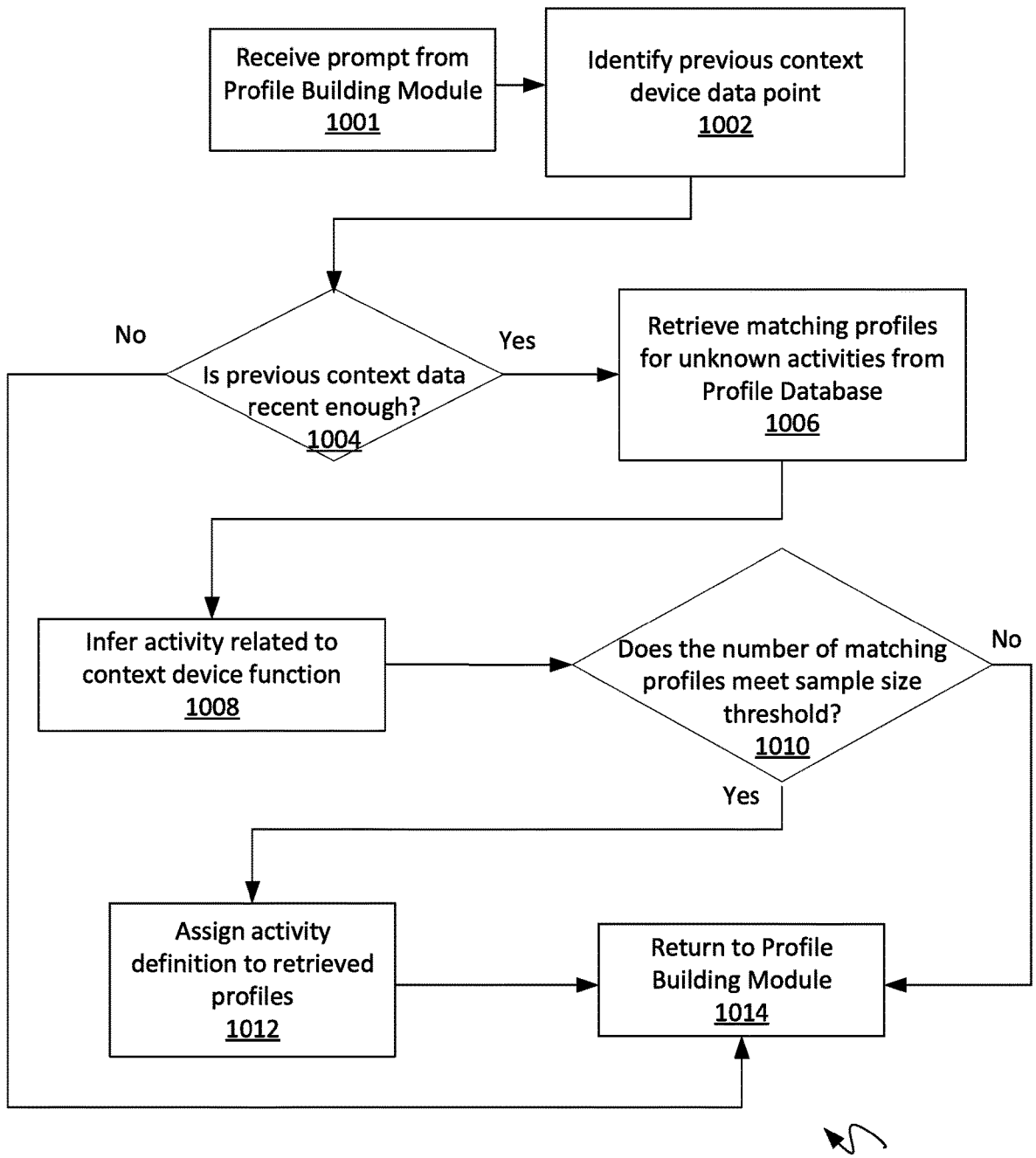
FIG. 10 is a flowchart illustrating an exemplary method for profiling device context.

FIG. 10 is a flowchart illustrating an exemplary method 1000 for profiling device context. Method 1000 may be performed based on execution of device context module 150. The device context process may begin with receiving a prompt from the profile building module 144 of an unknown activity profile coming from the activity identification module 118 that coincided with a data event from a context device 152 at step 1001. The device context module 150 may then identify the context device 152 that provided the most recent data point prior to the one supplied by the profile building module 144. For example, the stove in the kitchen supplied the most recent data point from a context device 152, the system will retrieve from the context device database 131 for the most recent data point prior to the data point being observed at step 1002, which may be a light switch in the kitchen.

The device context module 150 may then determine if the previous context data point is recent enough. There will be an amount of time, above which attempting to identify the activity is not practical. For example, if the user turns on the kitchen light and 2 seconds later, they ignite the stove, one could make an assumption that the user is starting meal preparation. However if the kitchen light being turned on is the data point being examined, and the most recent data point before that is 2 minutes ago the bathroom light was turned off, there is too much time between the data points, yielding too many variables to make an accurate inference about the activity that took place between the bathroom light being turned off and the kitchen light being turned on. In this example, we are using 5 seconds as the max interval, so any time this module is triggered by the profile building module 144 and the previous context device data point occurred at least five seconds previously, this module will end and return to the profile building module 144 at step 1004.

If the most recent context device data point is recent enough, in this example the kitchen light activation occurred two second before the stove activation, matching profiles of unknown events are retrieved from the profile database 122 at step 1006. The device context module 150 may then infer the activity related to the sequential operation of the two context devices 152, which can be done through the use of a natural language processing assistant. In an example, the activation of the kitchen light followed inside of 5 seconds by the activation of the stove is interpreted as starting meal preparation and could further differentiate activity definitions with time of day, and separate breakfast, lunch, dinner, etc. at step 1008.

The device context module 150 may then determine if the number of matching profiles received is greater than the sample size threshold, as opposed to utilizing user feedback to define an unknown profile. The device context process m define the activity associated with the profile from the function of the context device, but only after the same profile has been observed, coinciding with the same sequential operation of the two context device, a statistically significant number of times can the activity definition be assigned to the profiles. The threshold for statistical significance will vary from between use cases, and activities. The more uniform the received data the lower the threshold, the more variations or noise in the data the larger the number of observations needed to define the activity at step 1010. The device context module 150 may then assign an activity definition to the retrieved profiles related to the activity inferred at step 1012. The device context module 150 may then return to the profile building module 144 at step 1014.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for self-learning based on Wi-Fi-based localization and augmentation, the method comprising:
receiving a first set of data associated with a frequency response determined using channel state information (CSI), the first set of data retrieved from a wireless access point located in proximity to a monitored space;
receiving a second set of data from an Internet of Things (IoT) device located in proximity to the monitored space;
comparing the first set of data to the second set of data to identify when the first set of data differs from the second set of data; and
updating a profile database based on the comparison, wherein updating the profile database includes replacing the first set of data with the second set of data when the first set of data is determined to be different from the second set of data.

2. The method of claim 1, further comprising taking a sample of the frequency response, wherein the sample is defined as linked to the IoT device.

3. The method of claim 1, wherein the first and second sets of data includes location or activity data.

4. The method of claim 1, further comprising receiving a third set of data retrieved from one or more context devices located in proximity to the monitored space.

5. The method of claim 1, further comprising polling for known and unknown activities.

6. The method of claim 5, further comprising:
detecting an unknown activity based on the polling;
identifying that a specific sequence of at least two data points coincide, the at least two data points from at least two different connected context devices and occur within a predefined time window;
assigning an activity definition to the detected unknown activity in a new profile; and
adding the new profile to the profile database.

7. The method of claim 5, wherein detecting the unknown activity comprises:
retrieving all matching profiles without a known activity from the profile database; and
determining that a number of the matching profiles is greater than a sample size threshold.

8. A system for self-learning based on Wi-Fi-based localization and augmentation, the system comprising:
a wireless access point located in proximity to a monitored space, wherein the wireless access point provides a first set of data regarding the monitored space and associated with a frequency response determined using channel state information (CSI);
an Internet of Things (IoT) device located in proximity to the monitored space, the IoT device providing a second set of data regarding the monitored space; and
a cloud server that:
compares the first set of data to the second set of data to identify when the first set of data differs from the second set of data; and
updates a profile database based on the comparison, wherein updating the profile database includes replacing the first set of data with the second set of data when the first set of data is determined to be different from the second set of data.

9. The system of claim 8, wherein the cloud server further takes a sample of the frequency response, wherein the sample is defined as linked to the IoT device.

10. The system of claim 8, wherein the first and second sets of data includes location or activity data.

11. The system of claim 8, wherein the cloud server further receives a third set of data retrieved from one or more context devices located in proximity to the monitored space.

12. The system of claim 8, wherein the cloud server further polls for known and unknown activities.

13. The system of claim 12, wherein the cloud server further:
  detects an unknown activity based on the polling;
  identifies that a specific sequence of at least two data points coincide, the at least two data points from at least two different connected context devices and occur within a predefined time window;
  assigns an activity definition to the detected unknown activity in a new profile; and
  adds the new profile to the profile database.

14. The system of claim 12, wherein the cloud server detects the unknown activity by:
  retrieving all matching profiles without a known activity from the profile database; and
  determining that a number of the matching profiles is greater than a sample size threshold.

15. A non-transitory computer-readable storage medium having embodied thereon a program executable by a processor to perform a method for self-learning based on Wi-Fi-based localization and augmentation, the method comprising:
  receiving a first set of data associated with a frequency response determined using channel state information (CSI), the first set of data retrieved from a wireless access point located in proximity to a monitored space;
  receiving a second set of data from an Internet of Things (IoT) device located in proximity to the monitored space;
  comparing the first set of data to the second set of data to identify when the first set of data differs from the second set of data; and
  updating a profile database based on the comparison, wherein updating the profile database includes replacing the first set of data with the second set of data when the first set of data is determined to be different from the second set of data.

* * * * *